United States Patent [19]
Takeuchi

[11] Patent Number: 5,151,589
[45] Date of Patent: Sep. 29, 1992

[54] OPTICAL SYSTEM USING SPIN-DEPENDENT OPTICAL NONLINEARITY

[75] Inventor: Atsushi Takeuchi, Isehara, Japan

[73] Assignee: Fujitsu Limited, Kawasaki, Japan

[21] Appl. No.: 627,460

[22] Filed: Dec. 14, 1990

[30] Foreign Application Priority Data

Dec. 15, 1989 [JP] Japan .................. 1-325297

[51] Int. Cl.$^5$ .................. H01J 31/50; G02F 1/01
[52] U.S. Cl. .................. 250/213 A; 250/225; 359/108
[58] Field of Search .................. 250/213 A, 225; 377/102; 359/107, 108; 385/122

[56] References Cited

U.S. PATENT DOCUMENTS

| | | | |
|---|---|---|---|
| 4,782,223 | 11/1988 | Suzuki et al. | 250/213 A |
| 4,932,739 | 6/1990 | Islam | 359/108 |
| 4,978,842 | 12/1990 | Hinton et al. | 250/213 A |
| 4,999,139 | 3/1991 | Kurihara et al. | 385/122 |
| 4,999,485 | 3/1991 | Capasso et al. | 250/213 A |

*Primary Examiner*—David C. Nelms
*Assistant Examiner*—Michael Messinger
*Attorney, Agent, or Firm*—Armstrong & Kubovcik

[57] ABSTRACT

An optical system includes a first light emitting device for emitting a first polarized light beam other than a linearly polarized light beam, and a second light emitting device for emitting a second polarized light beam other than the linearly polarized light beam. The second polarized light beam has a pulse waveform. The optical system also includes a semiconductor device receiving the first and second polarized light beams. The semiconductor device has heavy holes and light holes. Each of the first and second polarized light beams has a wavelength which excites either heavy holes or light holes so that electrons are generated. The second polarized light beam is projected onto the semiconductor device in a state where the first polarized light beam is being projected onto the semiconductor device. The optical system further includes a light receiving device for receiving the first polarized light beam which has an intensity peak caused by the second polarized light beam and which decreases due to a spin relaxation of the electrons.

22 Claims, 13 Drawing Sheets

FIG.2
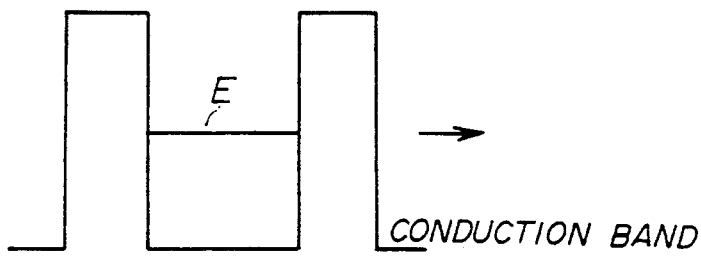
CONDUCTION BAND
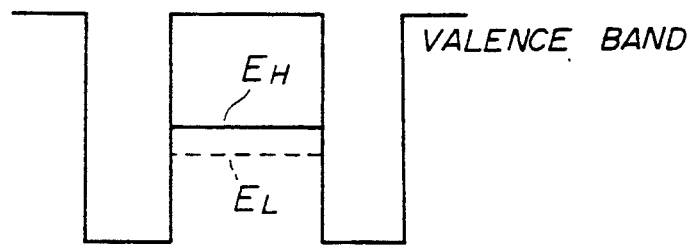
VALENCE BAND
FIG.3
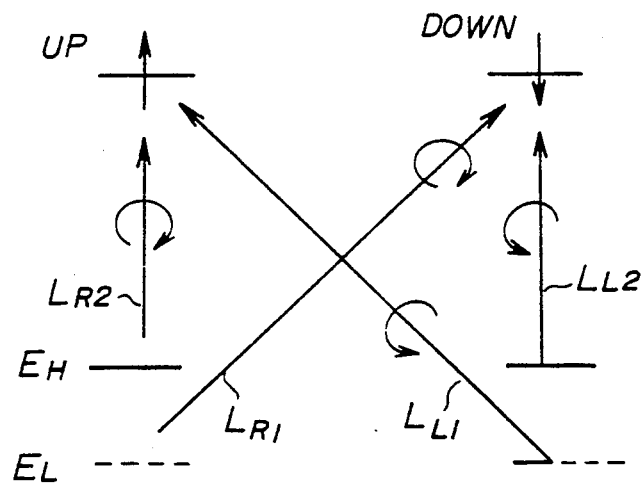

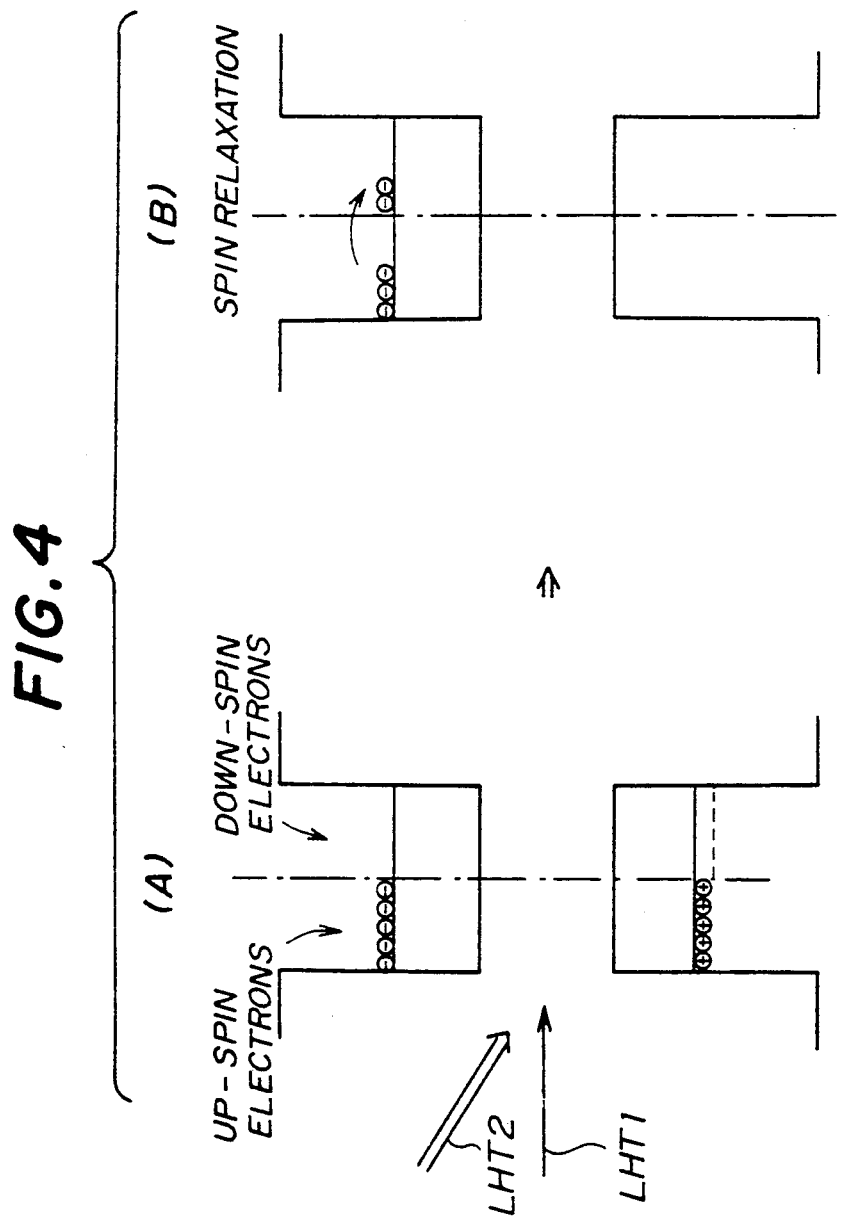

FIG.9
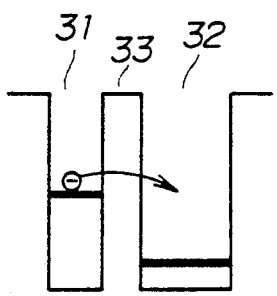
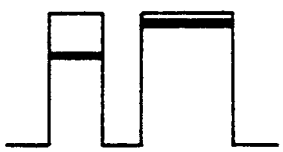
FIG.10
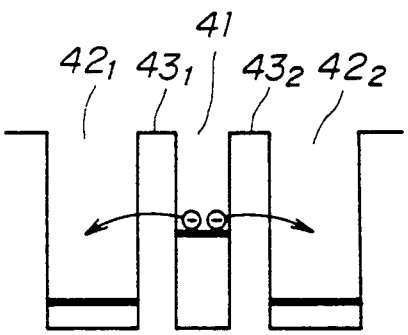
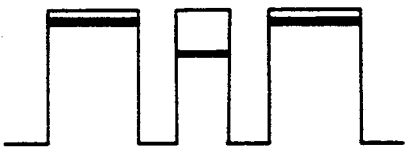
FIG.11
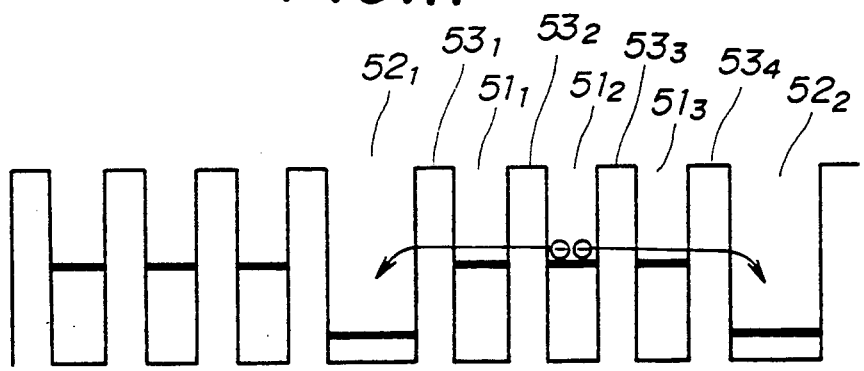
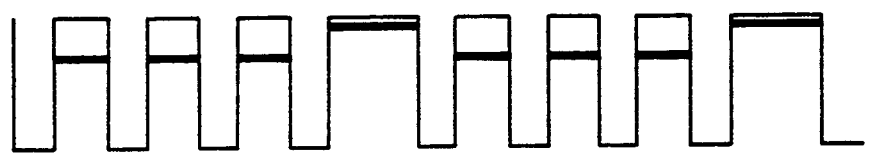

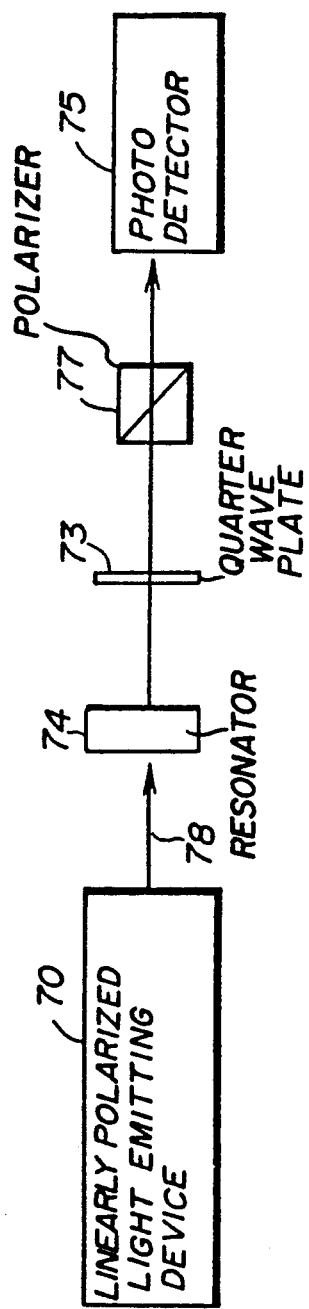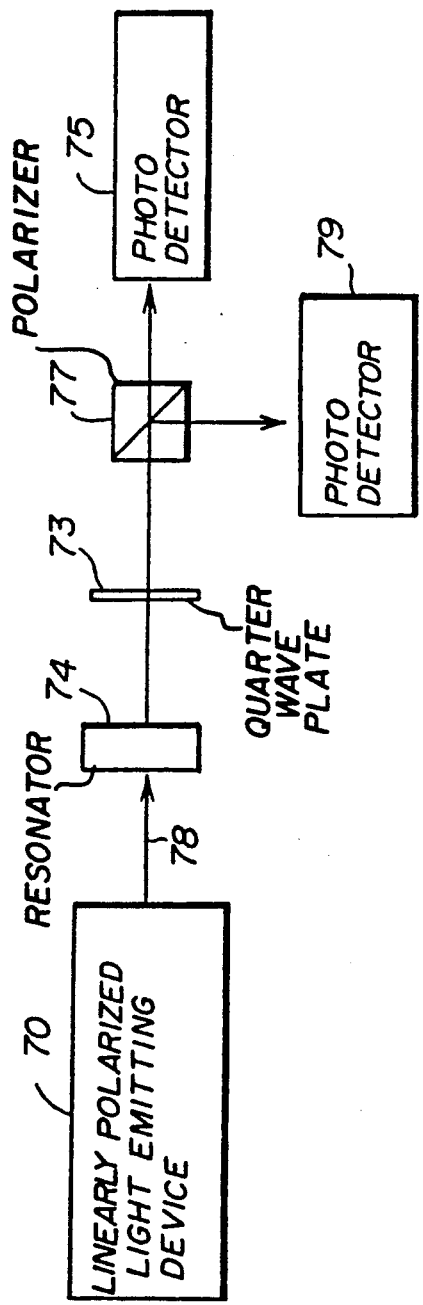

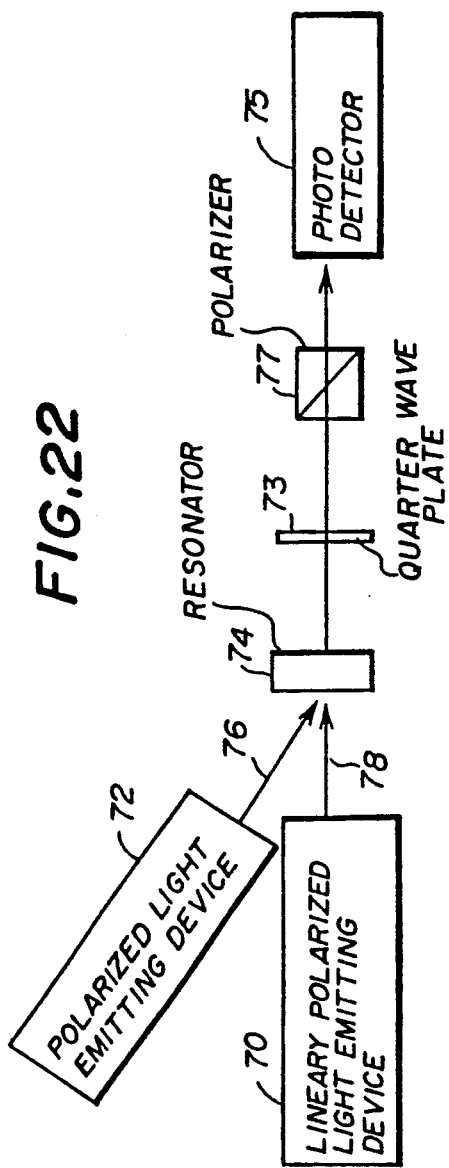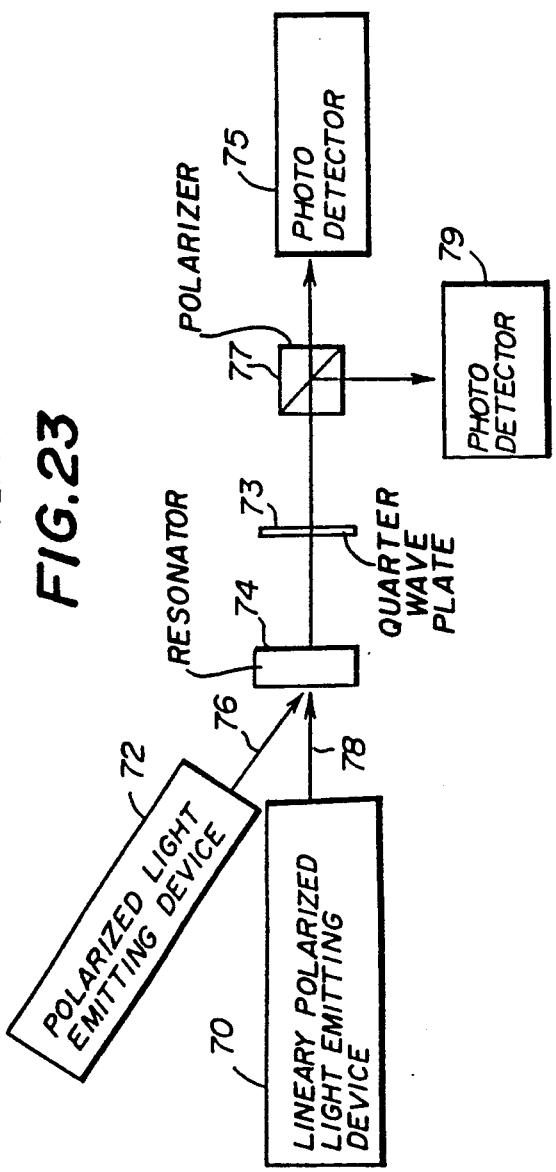

OPTICAL SYSTEM USING SPIN-DEPENDENT OPTICAL NONLINEARITY

BACKGROUND OF THE INVENTION

The present invention generally relates to an optical system, and more particularly to an optical system using spin-dependent optical nonlinearity. More especially, the present invention is concerned with an optical system which receives a probe beam (which corresponds to, for example, a carrier wave signal) and an excitation beam (which corresponds to, for example, an information signal) and which modulates the probe beam by the excitation beam.

Recently, there has been considerable activity in the development of an optical system using a semiconductor device in which an optical carrier wave beam is projected onto the semiconductor device and the intensity thereof is temporarily modulated by an excitation (information) beam which is also projected onto the semiconductor device.

Referring to FIG. 1, there is illustrated a conventional optical system. The conventional optical system in FIG. 1 is composed of a light emitting device 10, a light emitting device 12, a semiconductor device 14 and a photodetector 15 formed of, for example, a photodiode, a multiplier phototube or a charge-coupled device (CCD). The light emitting device 10 projects an excitation beam (which corresponds to an information signal) 16 onto the semiconductor device 14, and the light emitting device 12 projects a probe beam (which corresponds to a carrier wave signal) 18 onto the semiconductor device 14. The semiconductor device 14 is formed of, for example, a GaAs bulk crystal. Each of the optical beams 16 and 18 has a wavelength which causes an electron-hole transition in the semiconductor device 14. The photodetector 15 senses the intensity of the probe beam 18 passing through the semiconductor device 14.

When the probe beam 18 is continuously projected onto the semiconductor device 14, the electron-hole transitions are successively caused in the semiconductor device 14. Then, the semiconductor device 14 is changed to an equilibrium state. In this state, the semiconductor device 14 has a fixed transmittance, and the photodetector 15 detects the probe beam 18 having a constant intensity.

In this state, when the excitation beam 16 having a pulse-shaped waveform is projected onto the semiconductor device 14, the electron-hole transitions are caused therein, so that the equilibrium state of the semiconductor device 14 is destroyed. It will be noted that the semiconductor device 14 is capable of storing a predetermined number of electrons in an electron level and storing a predetermined number of holes in a hole level. When the semiconductor device 14 fills with the electrons and holes resulting from the electron-hole transitions, it no longer absorbs the probe beam 18 sufficiently. As a result, the semiconductor device 14 passes an increased amount of the probe beam 18, and the transmittance thereof increases. An increase in the transmittance of the semiconductor device 14 is rapidly caused.

The electrons created by projecting the excitation beam 16 onto the semiconductor device 14 are recombined with the holes with the lapse of time, so that the semiconductor device 14 is changed toward the initial equilibrium state. Thus, the transmittance of the semiconductor device 14 decreases gradually, and returns to the initial value obtained in the equilibrium state.

In the above-mentioned mechanism, the intensity of the probe beam 18 passing through the semiconductor device 14 is temporarily modulated by the excitation beam 16. It will be noted that the response time of the probe beam 18 is equal to or less than 1 ps and is sufficient to realize a high-speed response operation.

However, the optical system shown in FIG. 1 has a disadvantage in that it takes a long time (which is equal to a few nanoseconds) for the semiconductor device 14 to return to the initial equilibrium state after the electrons and holes are excited in response to the irradiation of the excitation beam 16. In other words, the time necessary for the electrons and holes to be recombined with each other in a nanoseconds. This means that it takes a few nanoseconds for the intensity of the probe beam 18 to decrease to a level sufficient to receive the next pulse of the excitation beam 16. This prevents practical applications of the device shown in FIG. 1.

SUMMARY OF THE INVENTION

It is a general object of the present invention to provide an improved optical system in which the above-mentioned disadvantage is eliminated.

A more specific object of the present invention is to provide an optical system which positively uses an optical nonlinearity of a semiconductor device and which has an improved response time.

The above-mentioned objects of the present invention are achieved by an optical system comprising:

first light emitting means for emitting a first polarized light beam other than a linearly polarized light beam;

second light emitting means for emitting a second polarized light beam other than the linearly polarized light beam, the second polarized light beam having a pulse waveform;

a semiconductor device receiving the first and second polarized light beams, the semiconductor device having heavy holes and light holes, each of the first and second polarized light beams having a wavelength which excites either heavy holes or light holes so that electrons are generated, the second polarized light beam being projected onto the semiconductor device in a state where the first polarized light beam is being projected onto the semiconductor device; and first light receiving means for receiving the first polarized light beam which has an intensity peak caused by the second polarized light beam and which decreases due to a spin relaxation of the electrons.

The aforementioned objects of the present invention are also achieved by an optical system comprising:

first light emitting means for emitting a substantially linearly polarized light beam;

resonator means having a semiconductor device, for receiving the substantially linearly polarized light beam having a wavelength close to a resonance wave length of the resonator and for outputting a first light beam;

a quarter-wave plate receiving the first light beam and outputting a second light beam;

a polarizer receiving the second light beam and outputting a third light beam; and first light receiving means for receiving the third light beam which results from the first light beam which has been right or left circularly polarized on the basis of the intensity of the substantially linearly polarized light beam.

Another object of the present invention is to provide an OR logic operation method using a semiconductor device as mentioned above.

This object of the present invention is achieved by an optical OR logic operation method comprising the steps of:

projecting a first polarized light beam other than a linearly polarized light beam onto a semiconductor device;

projecting a second polarized light beam other than the linearly polarized light beam onto the semiconductor device in a state where the first polarized light beam is being projected onto the semiconductor device, the second polarized light beam having a pulse waveform functioning first input data;

projecting a third polarized light beam other than the linearly polarized light beam onto the semiconductor device in a state where the first polarized light beam is being projected onto the semiconductor device, the second polarized light beam having a pulse waveform functioning as second input data, the semiconductor device having heavy holes and light holes, each of the first, second and third polarized light beams having a wavelength which excites either heavy holes or light holes so that electrons are generated; and receiving the first polarized light beam which has an intensity peak caused by at least one of the second and third polarized light beams and which decreases due to a spin relaxation of the electrons, the intensity peak of the first polarized light beam corresponding to the result of an OR operation on the first data and the second data.

BRIEF DESCRIPTION OF THE DRAWINGS

Other objects, features and advantages of the present invention will become more apparent from the following detailed description when read in conjunction with the accompanying drawings, in which:

FIGS. 2, 3 and 4 are respectively diagrams illustrating the principle of the present invention;

FIGS. 9, 10 and 11 are respectively energy band diagrams of semiconductor devices used in the second embodiment of the present invention;

FIGS. 18 and 19 are respectively block diagrams illustrating optical systems using the principle shown in FIG. 17;

FIGS. 22 and 23 are respectively block diagrams of modifications of the optical systems shown in FIGS. 18 and 19, respectively.

DESCRIPTION OF THE PREFERRED EMBODIMENTS

Figure 1:
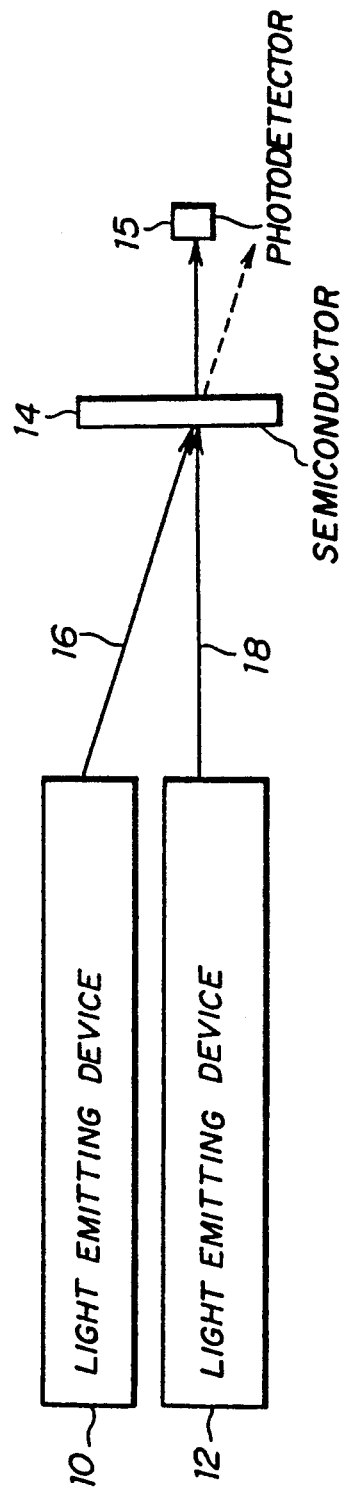
FIG. 1 is a block diagram illustrating a conventional optical modulation system.

A description will now be given of the principle of the present invention. Generally, when light is projected onto a semiconductor, holes in the valence band are exited and electrons are created in the conduction band. The created electrons in the conduction band have either up spins or down spins. When a light beam which has been linearly polarized is projected onto a semiconductor, created up-spin electrons and down-spin electrons are equal in number to each other.

On the other hand, when light which has been circularly polarized is projected onto a semiconductor, different transitions are observed, depending on whether the light is right circularly polarized or left circularly polarized. When the right-circular light is projected onto a semiconductor bulk, the proportion of excited up-spin electrons to excited down-spin electrons in the conduction band is 3:1, the proportion of excited heavy holes to exited light holes in the valence band is 3:1.

The excitation mechanism of a semiconductor having a quantum well obtained when circularly polarized light is projected onto the semiconductor is different from that of a semiconductor bulk. As shown in FIG. 2, holes are classified into heavy holes and light holes which have mutually different energy levels $E_H$ and $E_L$, respectively. On the other hand, electrons are classified into up-spin electrons and down-spin electrons which have an identical energy level. When circularly polarized light is projected onto such a semiconductor, electron-hole transitions shown in FIG. 3 take place. When right circularly polarized light $L_{R2}$ having a wavelength substantially corresponding to an electron-heavy hole transition energy level is projected onto the semiconductor, only heavy holes are excited and only up-spin electrons are created. On the other hand, when left circularly polarized light $L_{L2}$ having a wavelength substantially corresponding to the electron-heavy hole transition energy level is projected onto the semiconductor, only heavy holes are excited and only down-spin electrons are created. Since the energy level of light holes is higher than that of heavy holes, when light $L_{R1}$ or $L_{L1}$ having a wavelength substantially corresponding to an electron-light hole transition energy level is projected on a semiconductor having a quantum well, not only light holes but also heavy holes are excited. However, the number of light holes excited is much greater than that of heavy holes. Thus, up-spin electrons more than down-spin electrons or vice versa are excited.

Referring to FIG. 4, when a probe beam $LHT1$ which has been right circularly polarized and which has a wavelength corresponding to the electron-heavy hole transition energy level is projected onto a semiconductor device having a quantum well, only heavy holes are excited and only up-spin electrons are generated in the quantum well ((A) of FIG. 4). Since only up-spin electrons are generated, up-spin electrons in the conduction band are more than down-spin electrons therein. This state is called spin polarization. Then, up-spin electrons gradually change to down-spin electrons, as shown in (B) of FIG. 4. This is called spin relaxation. When the proportion of up-spin electrons to down-spin electrons becomes equal to 50%, the semiconductor device becomes the equilibrium state. In the equilibrium state, the transmittance of the semiconductor device is constant. In this state, a pulse-shaped excitation beam LHT2 which has been right circularly polarized and which has the substantially same wavelength as the probe beam LHT1 is projected onto the semiconductor device. The pulse duration time is shorter than the spin relaxation time. In response to the excitation beam LHT2, the equilibrium state of the semiconductor device is destroyed, and heavy holes are excited and changed to up-spin electrons in the quantum well. Then, the quantum well is saturated with the up-spin electrons. In the saturated state, the semiconductor device cannot absorb the probe beam LHT1 sufficiently, and has an increased level of transmittance. After that, the spin relaxation of electrons (excitons) occurs and the proportion of up-spin electrons to down-spin electrons becomes equal to 50%. It should be noted that the above spin relaxation occurs rapidly on the order of picosecond. In the above-mentioned way, the present invention positively utilizes optical nonlinearity spin relaxation of excitons.

Figure 5:
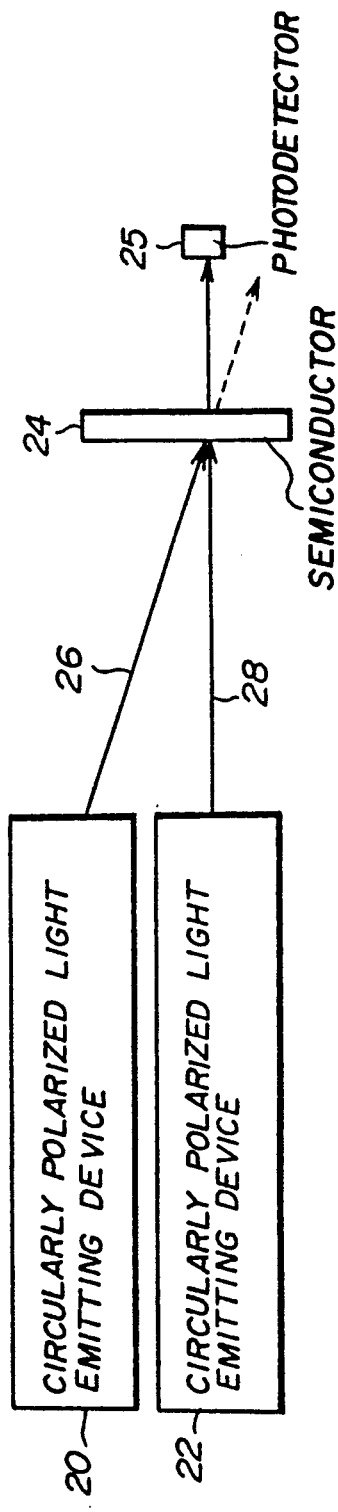
FIG. 5 is a block diagram illustrating an optical system according to first and second preferred embodiments of the present invention.

A description will now be given of an optical nonlinearity system according to a first preferred embodiment of the present invention, with reference to FIG. 5. The optical nonlinearity system shown in FIG. 5 is composed of a circularly polarized light emitting device 20, a circularly polarized light emitting device 22, a semiconductor device 24 and a photodetector 25.

Figure 6A:
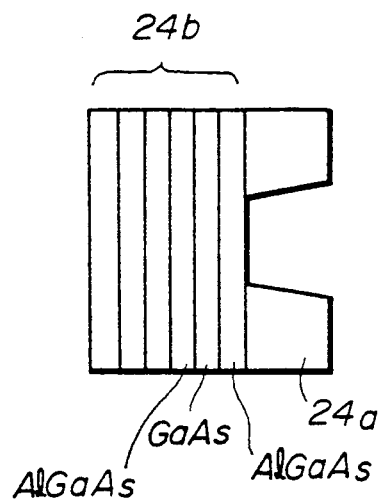
FIGS. 6A and 6B are diagrams illustrating a multiple quantum well structure used in the embodiments of the present invention.
Figure 6B:
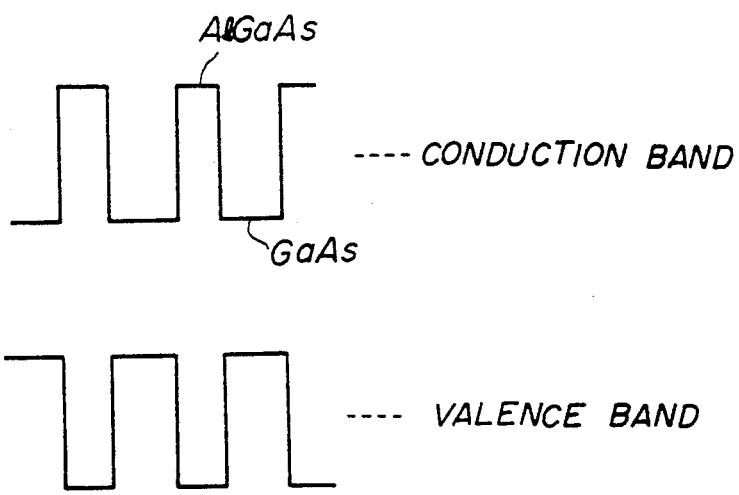

As shown in FIG. 6A, the semiconductor device 24 has a multiple quantum well (MQW) structure 24b formed on a semiconductor substrate 24a. In the MQW structure 24b, a GaAs layer and an AlGaAs layer are alternately stacked. FIG. 6B is an energy band diagram of the MQW structure 24b. It will be noted that a superlattice structure is a variation of MQWs.

The circularly polarized light emitting device 20 emits a right circularly polarized excitation beam 26 which causes electron-heavy hole transitions in the semiconductor device 24. The circularly polarized light emitting device 22 continuously or intermittently emits a right circularly polarized probe beam 28 having a wavelength substantially identical to that of the excitation beam 26. There are known many different types of circularly polarized light emitting devices, and the devices 20 and 22 can be formed of any of such known devices. For example, such a device includes the combination of a laser emitting device, a polarizer and a quarter-wave plate, the combination of a polarized light dye laser and a quarter-wave plate, the combination of a polarized light gas laser and a quarter-wave plate, the combination of a solid laser such as a YAG laser and a quarter-wave plate, or the combination of a light emitting diode, a polarizer and a quarter-wave plate.

A description will now be given of the operation of the optical system shown in FIG. 5. First, the circularly polarized light emitting device 22 continuously projects the right circularly polarized probe beam 28 onto the semiconductor device 24. For example, the circular-polarized probe beam 28 has a spot 15 μm in diameter on the semiconductor device 24. In response to this beam, electron-heavy hole transitions are successively caused, and then the semiconductor device 24 becomes the equilibrium state. In this state, the transmittance of the semiconductor device 24 is constant, and the photodetector 25 detects the probe beam 28 having a constant intensity level.

In this state, the excitation beam 26 which is intermittently emitted from the circularly polarized light emitting device 20 is projected for 1 ps. That is, a pulse of the excitation beam 26 having a pulse width corresponding to 1 ps is irradiated on the semiconductor device 24. For example, the circular-polarized excitation beam 26 has a spot 15 μm in diameter on the semiconductor device 24. The intensity of the circularly polarized excitation beam 26 is 0.3 mW, for example, and the intensity of the circularly polarized probe beam 28 is, for example, one-tenth that of the circularly polarized excitation beam 26. In response to the pulse-shaped excitation beam 26, electron-heavy hole transitions are caused in the semiconductor device 24, and thus the equilibrium state thereof is destroyed. Then, the semiconductor device 24 becomes unable to absorb the probe beam 28 sufficiently.

Figure 7:
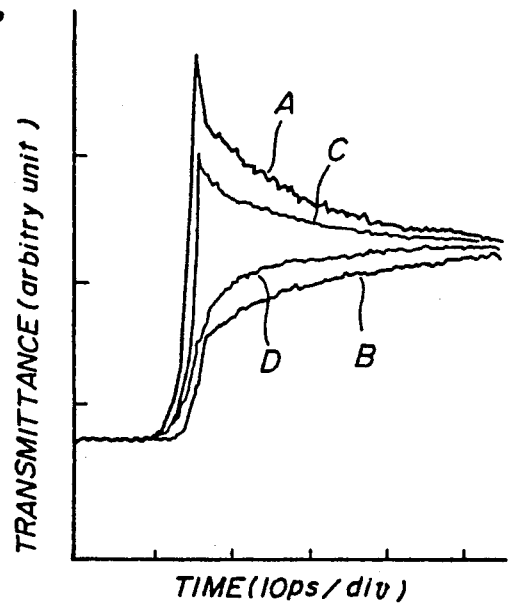
FIG. 7 is a graph illustrating the operation of a semiconductor device shown in FIG. 5.

As a result, the semiconductor device 24 passes a more amount of the probe beam 28 and, as shown by curve A in FIG. 7, the transmittance of the semiconductor device 24 increases rapidly. Up-spin electrons excited by the pulse-shaped excitation beam 26 are rapidly changed to down-spin electrons due to the spin relaxation, so that the semiconductor device 24 rapidly returns toward the initial equilibrium state. During this process, the increased transmittance level of the semiconductor device 24 decreases rapidly, and the transmittance thereof becomes half the peak of the increased transmittance level after about 16 ps. Finally, the semiconductor device 24 returns to the initial equilibrium state obtained before the excitation beam 26 is irradiated thereon.

As described above, the intensity of the probe beam (which corresponds to a carrier wave signal) is rapidly modulated on the order of 10 ps based on the spin relaxation time in response to the irradiation of the excitation beam 26. It should be noted that the transmittance of the conventional semiconductor device is modulated on the order of a few nanoseconds.

It is also possible to use the probe beam 28 which has been left circularly polarized. In this case, the left circularly polarized probe beam 28 is modulated so that as shown by curve B in FIG. 7, the transmittance of the semiconductor device 24 increases gradually as down-spin electrons increase temporarily. That is, the transmittance increases in accordance with the spin relaxation time after the excitation beam 28 is irradiated on the semiconductor device 24. Then, the peak of the transmittance level is obtained, and after that, the transmittance gradually decreases toward a level obtained in the initial equilibrium state.

It is also possible to use the probe beam 28 which has been left circularly polarized and the excitation beam 26 which has also been left circularly polarized. In this case, the transmittance of the semiconductor device 24 with respect to the probe light 28 is modulated, as shown by the curve A in FIG. 7.

It is also possible to use the probe beam 28 which has been right circularly polarized and the excitation beam 26 which has been left circularly polarized. In this case, the transmittance of the semiconductor device 24 with respect to the probe light 28 is modulated, as shown by the curve B in FIG. 7.

The MQW structure 24b shown in FIG. 6A is not limited to the GaAs/AlGaAs MQW structure. It is also possible to use the following MQW structures: indium gallium arsenide/indium phosphide (InGaAs/InP); indium gallium arsenide/indium aluminum arsenide (InGaAs/InAlAs); indium gallium arsenide phosphide/indium phosphide (InGaAsP/InP); indium gallium arsenide antimonide/indium phosphide (InGaAsSb/InP); or aluminum gallium arsenide antimonide/gallium antimonide (AlGaAsSb/GaSb). It is also possible to form the MQW structure 24b of a superlattice structure having any of the above-mentioned combinations. It is also possible to replace the MQW structure 24b by a single quantum well having any of the above-mentioned combinations.

A semiconductor bulk crystal can be substituted for the MQW structure 24b. Such a bulk crystal is formed of, for example, GaSb, InSb, InGaAs, AlGaAs, InP, CdMnTe, CdMnSe or ZnMnSe. When the bulk crystal is used, the proportion of up-spin electrons to down-spin electrons is 3:1 even when both the probe beam 28 and the excitation beam 26 which have been circularly polarized are used. Thus, the transmittance of the semiconductor 24 with respect to the probe beam 28 changes in ways different from those for the MQW structure or the single quantum well structure.

For example, when the right circularly polarized probe and excitation beams 28 and 26 are projected onto a bulk crystal of GaAs, the transmittance of this bulk crystal changes, as shown by curve C in FIG. 7. When the right circularly polarized probe beam 28 and the left circularly polarized excitation beam 26 are projected on the GaAs bulk crystal, the transmittance of the bulk crystal changes, as shown by curve D in FIG. 7.

It is also possible to form the semiconductor device 24 of an isotope substance, such as $Si^{29}$.

Figure 8:
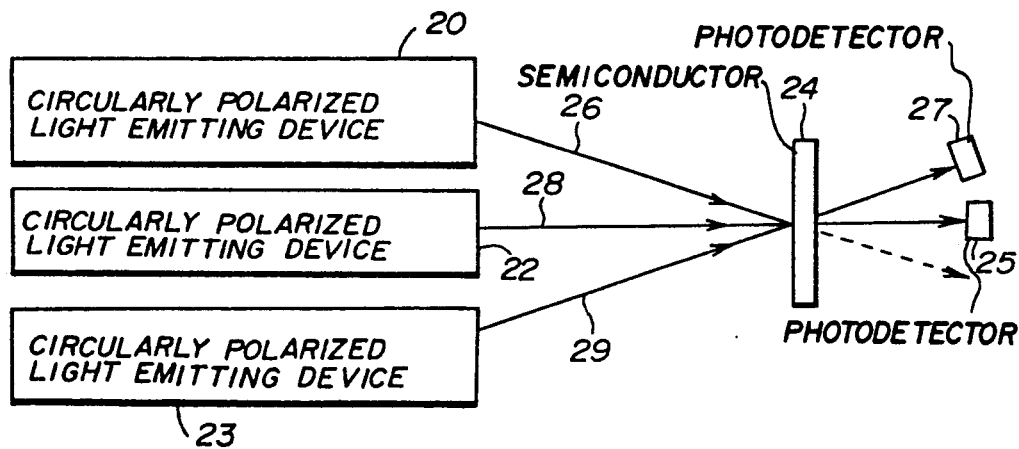
FIG. 8 is a block diagram illustrating a variation of the first and second embodiments of the present invention.

A description will be given of a variation of the aforementioned first preferred embodiment of the present invention with reference to FIG. 8, in which those parts which are the same as those shown in FIG. 5 are given the same reference numerals. The optical system shown in FIG. 8 is configured by adding a circularly polarized light emitting device 23 and a photodetector 27 to the configuration shown in FIG. 5. The circularly polarized light emitting device 23 emits a probe beam 29 which has a polarized direction opposite to that of the circularly polarized probe beam 28. For example, when the probe beam 28 has been right circularly polarized, the probe beam 29 has been left circularly polarized. When the excitation beam 26 has been right circularly polarized, the transmittance of the semiconductor device 24 having, for example, the GaAs/AlGaAs single or multiple quantum well structures changes with respect to the right circularly polarized probe beam 28, as shown by the curve A, and the transmittance thereof changes as shown by the curve B with respect to the left circularly polarized probe beam 29. According to the structure shown in FIG. 8, it is possible to obtain modulated probe beams 28 and 29 at the same time.

The optical device in FIG. 8 also functions as an OR circuit. The excitation beams 26 and 29 are first and second data signals. When at least one of the excitation beams 26 and 29 are applied, the photodetector 26 detects a change of the intensity of the probe beam 28.

A description will be given of a second preferred embodiment of the present invention. The second embodiment of the present invention corresponds to an improvement of the aforementioned first preferred embodiment of the present invention. The second embodiment of the present invention utilizes not only the spin relaxation of excitons but also tunneling of electrons. According to the first preferred embodiment of the present invention, the transmittance of the semiconductor device with respect to the probe beam rapidly decreases toward the initial equilibrium state due to the spin relaxation of excitons (electrons). According to the second embodiment of the present invention, the transmittance also decreases due to the tunneling effect of electrons. That is, the transmittance decreases due to the synergetic effect of spin relaxation and electron tunneling. In order to utilize the tunneling effect of electrons, the second embodiment of the present invention uses multiple quantum well structures (including superlattice structures).

The optical system according to the second preferred embodiment of the present invention is the same as that of the optical system shown in FIG. 5 except the structure of the semiconductor device 24. The semiconductor device 24 used in the second preferred embodiment of the present invention is configured as follows.

FIG. 9 is an energy band diagram of a basic structure of a first MQW structure of the semiconductor device 24 used in the second preferred embodiment of the present invention. The basic structure of the first MQW structure is composed of a first layer 31, a second layer 32 and a third layer 33. The first layer 31 and the second layer 32 are made of, for example, GaAs, and the third layer 33 is made of, for example, AlGaAs. The third layer 33 is sandwiched between the first layer 31 and the second layer 32. The forbidden band width of the third layer 33 is greater than the forbidden band widths of the first layer 31 and the second layer 32. The first layer 31 has a thickness which enables excitons (electrons) to exist therein. The second layer 32 has a thickness so that the lowest energy level of electrons in the first layer 31 is higher than the lowest energy level of electrons in the second layer 32. The third layer 33 has a thickness so that electrons in the first layer 31 pass through the third layer 33 by tunneling. The first layer structure has a plurality of stacked basic structures shown in FIG. 9.

For example, the first and second GaAs layers 31 and 32 are respectively 4.5 nm thick and 9.0 nm thick, and the third AlGaAs layer 33 is 2.8 nm thick. The MQW layer structure is formed on a GaAs substrate by a molecular beam epitaxy process, and then the GaAs substrate is removed.

FIG. 10 is an energy band diagram of a basic structure of a second MQW structure used in the second preferred embodiment of the present invention. The basic structure shown in FIG. 10 is composed of a first layer 41, two second layers $42_1$ and $42_2$, and two third layers $43_1$ and $43_2$. The forbidden band widths of the third layers $43_1$ and $43_2$ are greater than the forbidden band widths of the first layer 41 and the second layers $42_1$ and $42_2$. The third layers $43_1$ and $43_2$ are located on both sides of the first layer 41, and the second layers $42_1$ and $42_2$ are adjacent to the third layers $43_1$ and $43_2$, respectively. The first layer 41 has a thickness which enables the electrons (excitons) to be therein. Each of the second layers $42_1$ and $42_2$ has a thickness so that the lowest energy level of electrons in the first layer 41 is greater than that in each of the second layers $42_1$ and $42_2$. Each of the third layers $43_1$ and $43_2$ has a thickness so that the electrons in the first layer 41 pass through the third layers $43_1$ and $43_2$ by tunneling. The first and second layers 41, $42_1$ and $42_2$ are made of, for example, GaAs, and the third layers $43_1$ and $43_2$ are made of, for example, AlGaAs.

FIG. 11 is an energy band diagram of a basic structure of a third MQW structure used in the second preferred embodiments of the present invention. The basic structure is composed of a plurality of first layers $51_1$, $51_2$ and $51_3$, two second layers $52_1$ and $52_2$, and a plurality of third layers $53_1$, $53_2$, $53_3$ and $53_4$. The first layers $51_1$, $51_2$ and $51_3$, and the third layers $53_1$, $53_2$, $53_3$ and $53_4$ are alternately arranged. This alternate arrangement is sandwiched between the second layers $52_1$ and $52_2$. The other conditions of the first through third layers are the same as those in the first and second basic structures.

The first and second layers of the above-mentioned first, second and third MQW structures are not limited to GaAs, and the third layers thereof are not limited to AlGaAs. It is also possible to use the aforementioned substances. It is also possible to use a fourth MQW structure in which the basic structures of the first and second MQW structures are mixed.

Figure 12:
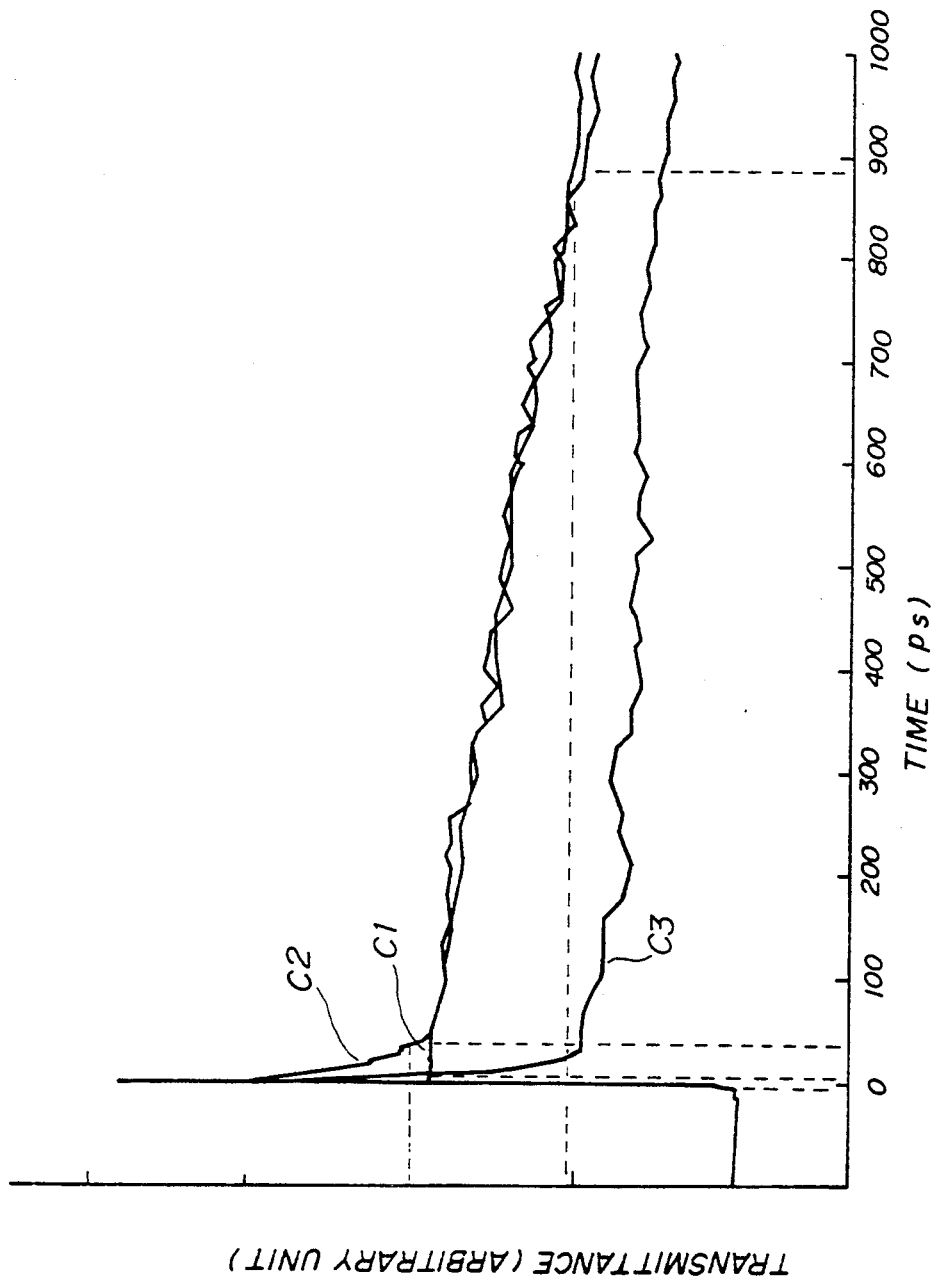
FIG. 12 is a graph illustrating the effects of the first and second embodiments of the present invention, as compared with the conventional optical system shown in FIG. 1.

FIG. 12 is a graph illustrating changes of the transmittance as a function of time. Curve C1 shows a change of the transmittance of the semiconductor device 14 shown in FIG. 1, curve C2 shows a change of the transmittance of the semiconductor device 24 (FIG. 5) which utilizes only the spin relaxation of carriers according to the first embodiment of the present invention, and curve C3 shows a change of the transmittance of the semiconductor device 24 which utilizes not only the spin relaxation but also the tunneling effect according to the second embodiment of the present invention. The probe beam 28 and the excitation beam 26 have beam right circularly polarized. It can be seen from the graph of FIG. 12 that the transmittance peaks obtained by the first and second embodiments are much greater than that obtained by the conventional system 14. Further, it can be seen that the transmittance levels of the semiconductor device 24 according to the first and second embodiments decrease much more rapidly than the conventional semiconductor device 14 and that the transmittance level of the semiconductor device according to the second embodiment decreases much more rapidly than that of the semiconductor device 14 according to the first embodiment.

Figure 13:
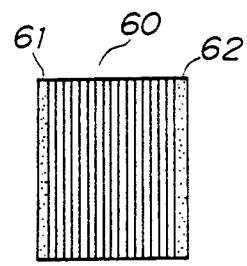
FIGS. 13, 14 and 15 are respectively diagrams illustrating variations of the second embodiment of the present invention.

A description will now be given of variations of the second embodiment of the present invention. Referring to FIG. 13, there is illustrated a semiconductor device which is composed of a semiconductor layer 60 having any of the aforementioned multiple quantum well structures or superlattice structures, and two mirrors 61 and 62 mounted on both opposite sides of the semiconductor structure 60. The semiconductor device shown in FIG. 13 functions as a Fabry-Perot resonator. Each of the mirrors 61 and 62 has, for example, a dielectric multiple layer structure consisting of a plurality of stacked dielectric layers. It is also possible to form each of the mirrors 61 and 62 of a metallic evaporation film made of, for example, gold (Au) which is directly deposited on the corresponding surface of the semiconductor layer 60.

Figure 14:
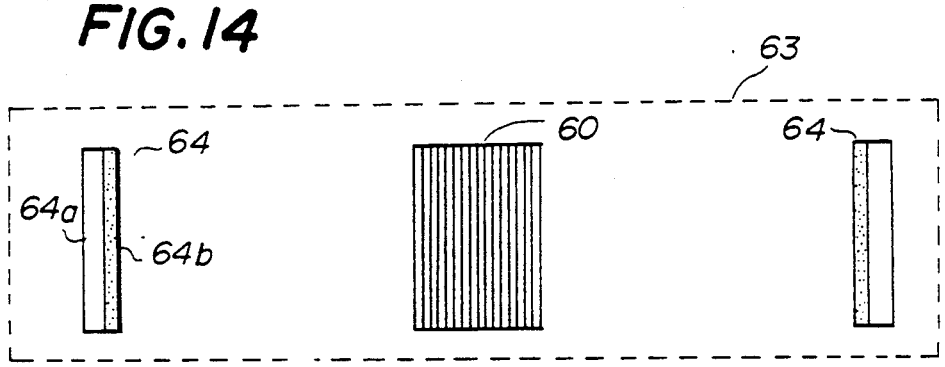

It is also possible to use a Fabry-Perot resonator 63 shown in FIG. 14. The Fabry-Perot resonator 63 in FIG. 14 has two mirrors 64 and the semiconductor layer 60 located between the mirrors 64. It will be noted that the two mirrors 64 are spaced apart from the semiconductor layer 60. Each of the mirrors 64 is formed of a dielectric multiple layer 64b evaporated on a glass plate 64a. It is also possible to form the layer 64b of a metallic evaporation layer.

Figure 15:
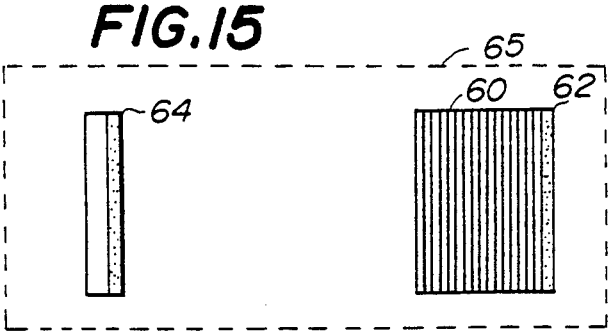

It is also possible to use a Fabry-Perot resonator 65 shown in FIG. 15, which is the combination of the structures shown in FIGS. 13 and 14. The mirror 62 is provided on a surface of the semiconductor layer 61, and the mirror 64 faces a surface of the semiconductor layer 60 opposite to the surface on which the mirror 62 is mounted.

Figure 16:
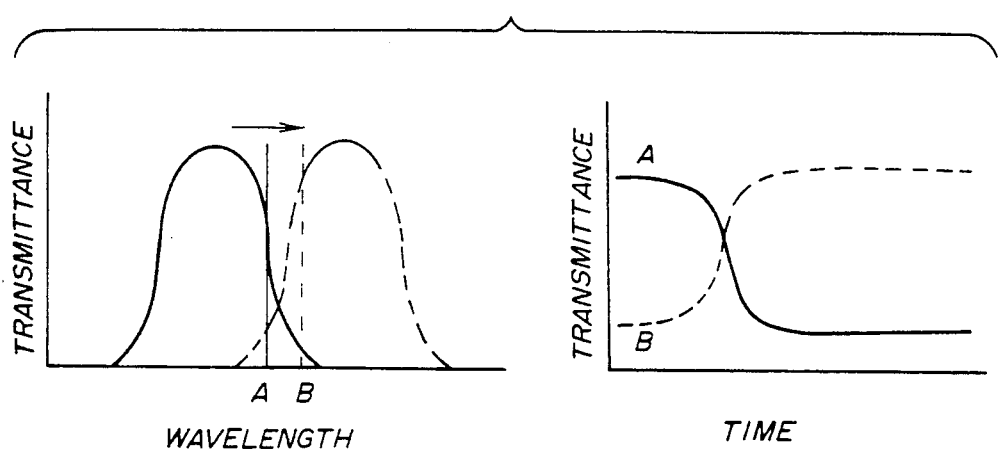
FIG. 16 is graphs illustrating the operation of a Fabry-Perot resonator.

When the pulse-shaped excitation beam 26 (FIG. 5) having a wavelength close to the electron-heavy (or light) hole transition energy level is projected onto the above-mentioned Fabry-Perot resonator onto which the probe beam 28 is projected, as shown in FIG. 16, the refractive index of the semiconductor layer 60 provided in the Fabry-Perot resonator is rapidly changed, and thus the resonance peak of the Fabry-Perot resonator is rapidly changed from the solid line curve to the broken line curve. This change of the refractive index contributes to decreasing the transmittance of the semiconductor device 24. According to the present embodiment, the transmittance or the refractive index will be restored rapidly due to the spin relaxation and tunneling effect.

The applicant is aware of a Fabry-Perot resonator in which a GaAs/AlAs superlattice structure is sandwiched between dielectric multiple layer mirrors (see A.Migus et al., Appl. Phys. Lett. 46(85)70). The conventional Fabry-Perot resonator shown in the above document uses linearly polarized beams and can provide only the light intensity modulation based on the normal electron-hole transition. That is, the conventional Fabry-Perot resonator does not use circularly polarized beams and does not utilize the spin relaxation and tunneling effect.

A description will be given of an optical system according to a third preferred embodiment of the present invention. This optical system uses, for example, any of the Fabry-Perot resonators shown in FIGS. 13, 14 and 15.

Figure 17:
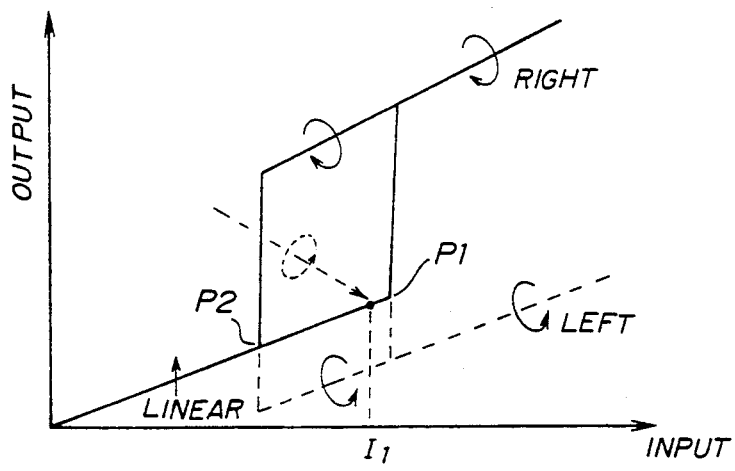
FIG. 17 is a graph illustrating the principle of a third preferred embodiment of the present invention.

FIG. 17 is a graph illustrating the principle of the third preferred embodiment of the present invention, in which the horizontal axis represents the intensity of an input light beam (which corresponds to the probe beam 28) projected onto the Fabry-Perot resonator, and the vertical axis represents the intensity thereof which has passed through the Fabry-Perot resonator. When the linearly polarized light beam is projected onto the Fabry-Perot resonator, the refractive index of the semiconductor device provided therein changes, and thus the effective resonator length also changes. As the intensity of the linearly polarized input beam increases and reaches to a point P1, the output beam emitted from the Fabry-Perot resonator rapidly changes to a right circularly polarized beam or a left circularly polarized beam. It will be noted that the refractive index of the Fabry-Perot resonator consists of two refractive indexes, one of which is related to the up-spin electrons, and the other one of which is related to the down-spin electrons. It will also be noted that linearly polarized light consists of a right circularly polarized component related to up-spin electrons and a left circularly polarized component related to down-spin electrons. If the intensity of the right circularly polarized component is slightly greater than that of the left circularly polarized component due to a certain cause, such as noise, the linearly polarized beam will change to the right circularly polarized beam at the point P1. On the other hand, if the intensity of the left circularly polarized component is slightly greater than that of the right circularly polarized component, the linearly polarized beam will change to the left circularly polarized beam at the point P1.

On the other hand, as the intensity of the input beam projected onto the Fabry-Perot resonator decreases, the right circularly polarized output beam rapidly changes to the linearly polarized beam at a point P2, and the left circularly polarized output beam rapidly changes to the linearly polarized beam at the point P2. That is, the Fabry-Perot resonator has a hysteresis loop of light intensity. In other words, an intensity threshold operation can be obtained. At an input intensity level I1, the Fabry-Perot resonator has three stable states. That is, the Fabry-Perot resonator has optical tristability. It will be noted that the wavelength of the beam irradiated on the Fabry-Perot resonator is slightly longer than the absorption peak and slightly shorter than the resonance peak of the Fabry-Perot resonator.

FIG. 18 is a block diagram of an optical system according to the third preferred embodiment. The optical system in FIG. 18 is made up of a linearly polarized light emitting device 70, a Fabry-Perot resonator 74 having the aforementioned structure, a quarter-wave plate 73, a polarizer 77 and a photodetector 75. The linearly polarized light emitting device 70 emits a linearly polarized beam 78, which is projected onto the Fabry-Perot resonator 74. An output beam from the Fabry-Perot resonator 74 passes through the quarter-wave plate 73 and the polarizer 77. The photodetector 75 receives only the right circularly polarized component or left circularly polarized component.

Figure 20A:
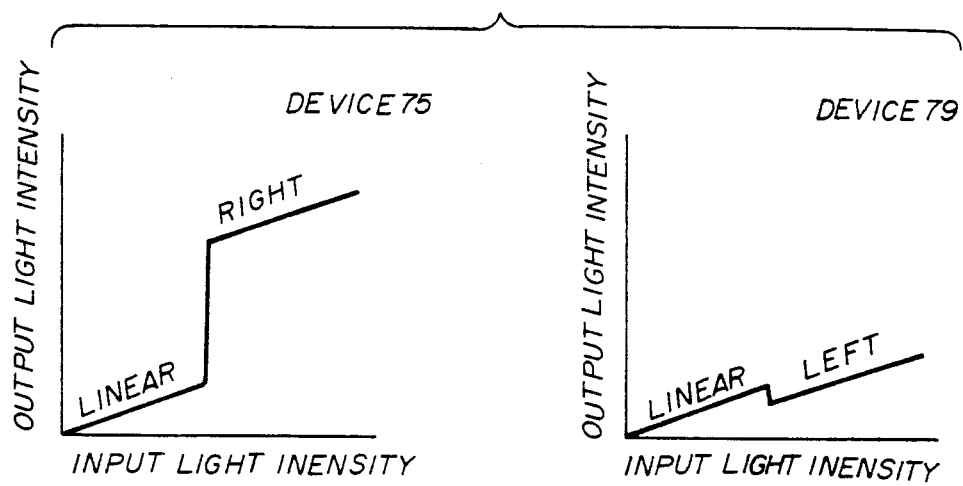
FIGS. 20A, 20B, 21A and 21B are graphs illustrating the operations of the optical systems shown in FIGS. 18 and 19.
Figure 20B:
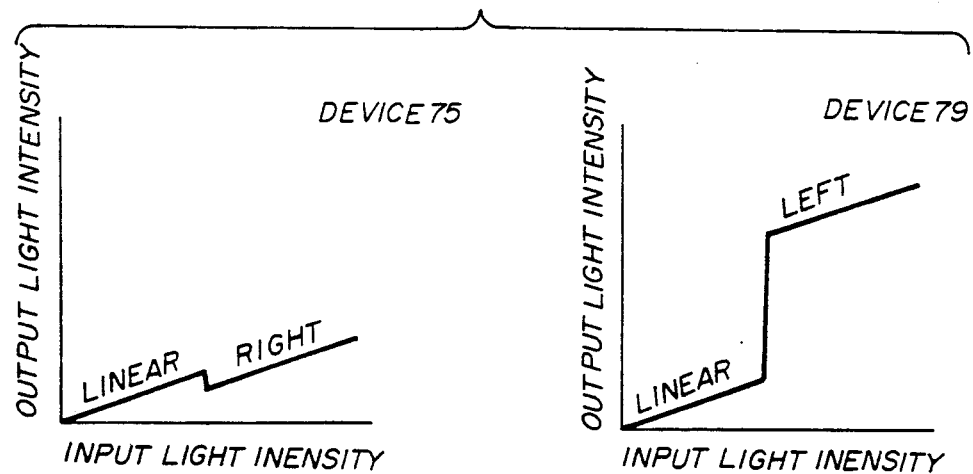
Figure 21A:
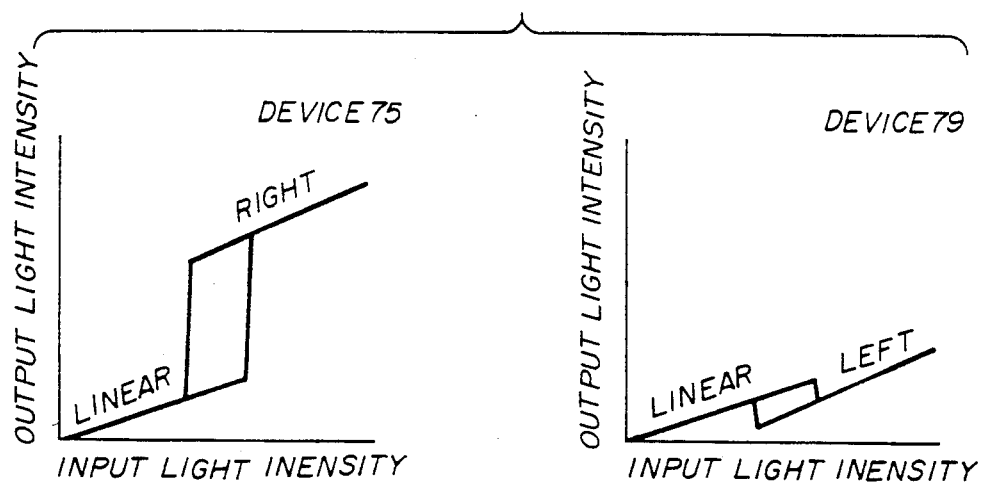
Figure 21B:
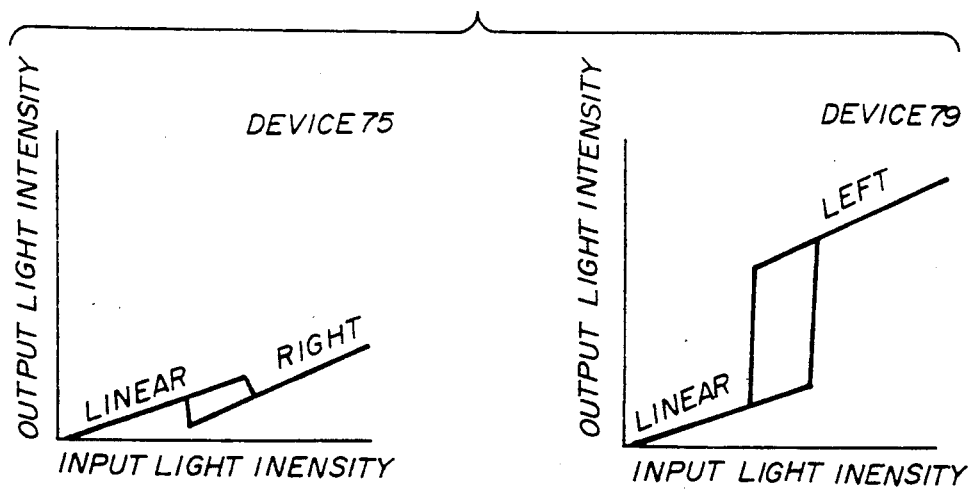

FIG. 19 is a block diagram illustrating another configuration of the optical system according to the third embodiment. In FIG. 19, those parts which are the same as those shown in FIG. 18 are given the same reference numerals. A photodetector 79 is provided for receiving a light component reflected by the polarizer 77. When the optical system shown in FIG. 19 performs the intensity threshold operation, the photodetectors 75 and 79 sense changes of the intensity of the beam components, as shown in FIG. 20A or FIG. 20B. Alternatively, when the optical system shown in FIG. 19 performs the bistable operation, the photodetectors 75 and 79 sense changes of the intensity of the beam components, as shown in FIG. 21A or FIG. 21B.

It becomes possible to more definitely obtain the desired circularly polarized beam from the linearly polarized beam by projecting a polarized excitation beam onto the Fabry-Perot resonator. FIG. 22 is a block diagram of an optical system which is configured by adding a polarized light emitting device 72 to the structure shown in FIG. 18. The polarized light emitting device 72 emits, for example, an elliptically polarized excitation beam 76 having a right circularly polarized component which is slightly stronger than a left circularly polarized component. The elliptically polarized beam 76 is illustrated by the broken line in FIG. 17. The elliptically polarized beam 76 is projected onto the Fabry-Perot resonator 74 when the linearly polarized probe beam 78 has the intensity level I1 (FIG. 17). In response to the excitation beam 76, the linearly polarized probe beam 78 is changed to a right circularly polarized beam by the Fabry-Perot resonator 74. Similarly, the structure shown in FIG. 19 can be modified, as shown in FIG. 23.

In each of the first and second embodiments, in place of the right and left circularly polarized beams, it is possible to use elliptically polarized beams which have right and left circularly polarized components greater than left and right circularly polarized components, respectively.

It will be noted that it is necessary to cool the semiconductor device to, for example, 77° K., when it is formed of a semiconductor bulk crystal. On the other hand, it is not necessary to cool the semiconductor device when it has the quantum well structure or the multiple quantum well structure.

The present invention is applicable to optical devices having operation speeds in the range between $10^{-9}$ seconds and $10^{-12}$ seconds, such as light-input/light-output switches, optically bistable devices, and light-input/light-output memories.

The present invention is not limited to the specifically disclosed embodiments, and variations and modifications may be made without departing from the scope of the present invention.

What is claimed is:

1. An optical system comprising:
   first light emitting means for emitting a first nonlinearly polarized light beam;
   second light emitting means for emitting a second nonlinearly polarized light beam, said second nonlinearly polarized light beam having a pulse waveform;
   a semiconductor device receiving said first and second nonlinearly polarized light beams, said semiconductor device having heavy holes and light holes, each of said first and second nonlinearly polarized light beams having a wavelength which excites either heavy holes or light holes so that electrons are generated, said second nonlinearly polarized light beam being projected onto said semiconductor device in a state where said first nonlinearly polarized light beam is being projected onto said semiconductor device; and
   first light receiving means for receiving said first nonlinearly polarized light beam which has an intensity peak caused by said second nonlinearly polarized light beam and which decreases due to a spin relaxation of said electrons.

2. An optical system as claimed in claim 1, wherein:
   said first nonlinearly polarized light beam comprises a light beam circularly polarized in a first direction; and
   said second nonlinearly polarized light beam comprises a light beam circularly polarized in a second direction which is the same as said first direction.

3. An optical system as claimed in claim 1, wherein:
   said first nonlinearly polarized light beam comprises a light beam circularly polarized in a first direction; and
   said second nonlinearly polarized light beam comprises a light beam circularly polarized in a second direction which is opposite to said first direction.

4. An optical system as claimed in claim 1, wherein:
   said semiconductor device comprises a quantum well structure having a first semiconductor layer, a second semiconductor layer, and a third semiconductor layer sandwiched between said first and second semiconductor layers; and
   a quantum well is formed in said third semiconductor layer.

5. An optical system as claimed in claim 1, wherein:

said semiconductor layer comprises a multiple quantum well structure having a first group of semiconductor layers and a second group of semiconductor layers;

said first group of semiconductor layers and said second group of semiconductor layers are alternately stacked; and a quantum well is formed in each of said first group of semiconductor layers.

6. An optical system as claimed in claim 1, wherein:

said semiconductor layer comprises a superlattice structure having a first group of semiconductor layers and a second group of semiconductor layers; and said first group of semiconductor layers and said second group of semiconductor layers are alternately stacked.

7. An optical system as claimed in claim 1, wherein said semiconductor device comprises a bulk crystal of a semiconductor.

8. An optical system as claimed in claim 1, wherein:

said semiconductor device comprises a plurality of basic structures which are successively stacked;

each of said plurality of basic structures comprises a first semiconductor layer, a second semiconductor layer, and a third semiconductor layer sandwiched between said first and second semiconductor layers;

said first semiconductor layer has a first forbidden band width, and said second semiconductor layer has a second forbidden band width substantially equal to said first forbidden width;

said third semiconductor layer has a third forbidden band width greater than said first and second forbidden band widths;

said first and second semiconductor layers have first and second thicknesses, respectively, so that a lowest energy level of electrons in said first semiconductor layer is higher than that of electrons in said second semiconductor layer; and said third semiconductor layer has a third thickness so that the electrons in said first semiconductor layer pass through said third semiconductor layer by tunneling and reach to said second semiconductor layer.

9. An optical system as claimed in claim 1, wherein:

said semiconductor device comprises a plurality of basic structures which are successively stacked;

each of said plurality of basic structures comprises a first semiconductor layer, two second semiconductor layers identical to each other, and two third semiconductor layers identical to each other;

said first semiconductor layer is sandwiched between said two third semiconductor layers;

said two third semiconductor layers are interposed between said two second semiconductor layers;

said first semiconductor layer has a first forbidden band width, and each of said second semiconductor layers has a second forbidden band width substantially equal to said first forbidden width;

each of said third semiconductor layers has a third forbidden band width greater than said first and second forbidden band widths;

said first semiconductor layer has a first thickness and each of said second semiconductor layers has a second thickness so that a lowest energy level of electrons in said first semiconductor layer is higher than that of electrons in each of said second semiconductor layers; and each of said third semiconductor layers has a third thickness so that the electrons in said first semiconductor layer pass through said third semiconductor layers by tunneling and reach to said second semiconductor layers.

10. An optical system as claimed in claim 1, wherein:

said semiconductor device comprises a plurality of basic structures which are successively stacked;

each of said plurality of basic structures comprises a first group of semiconductor layers identical to each other, a second group of semiconductor layers identical to each other, and a third group of semiconductor layers identical to each other;

said first group of semiconductor layers and said third group of semiconductor layers are alternately stacked;

said first group of semiconductor layers and said third group of semiconductor layers are interposed between said second group of semiconductor layers;

each of said first group of semiconductor layers has a first forbidden band width, and each of said second group of semiconductor layers has a second forbidden band width substantially equal to said first forbidden width;

each of said third group of semiconductor layers has a third forbidden band width greater than said first and second forbidden band widths;

each of said first group of semiconductor layers has a first thickness and each of said second group of semiconductor layers has a second thickness so that a lowest energy level of electrons in said first group of semiconductor layers is higher than that of electrons in said second group of semiconductor layers; and each of said third group of semiconductor layers has a third thickness so that the electrons in said first group of semiconductor layers pass through said third group of semiconductor layers by tunneling and reach to said second group of semiconductor layers.

11. An optical system as claimed in claim 1, wherein said semiconductor device comprises:

a multiple quantum layer structure having a plurality of quantum wells;

a first mirror formed directly on a first surface of said multiple quantum layer structure; and a second mirror formed directly on a second surface of said multiple quantum layer structure opposite to said first surface thereof.

12. An optical system as claimed in claim 1, wherein: said semiconductor device comprises a resonator, and wherein said resonator comprises:

a multiple quantum layer structure having a plurality of quantum wells;

a first mirror spaced apart from a first surface of said multiple quantum layer structure; and a second mirror spaced apart from a second surface of said multiple quantum layer structure opposite to said first surface thereof.

13. An optical system as claimed in claim 1, wherein: said semiconductor device comprises a resonator, and wherein said resonator comprises:

a multiple quantum layer structure having a plurality of quantum wells;

a first mirror formed directly on a first surface of said multiple quantum layer structure; and a second mirror spaced apart from a second surface of said multiple quantum layer structure opposite to said first surface thereof.

14. An optical system as claimed in claim 1, further comprising:
third polarized light emitting means for emitting a third nonlinearly polarized light beam having a polarized direction opposite to that of said first polarized light beam; and
second light receiving means for receiving said third nonlinearly polarized light beam which has an intensity peak caused by said second nonlinearly polarized light beam and which decreases due to a spin relaxation of said electrons.

15. An optical system comprising:
first light emitting means for emitting a substantially linearly polarized light beam;
resonator means having a semiconductor device, for receiving said substantially linearly polarized light beam having a wavelength substantially corresponding to a resonance wave length of said resonator means and for outputting a first light beam;
a quarter-wave plate receiving said first light beam and outputting a second light beam;
a polarizer receiving said second light beam and outputting a third light beam; and
first light receiving means for receiving said third light beam which results from said first light beam which has been right or left circularly polarized on the basis of the intensity of said substantially linearly polarized light beam.

16. An optical system as claimed in claim 15, further comprising second light emitting means for emitting a nonlinearly polarized light beam, wherein:
said polarized light beam emitted from said second light emitting means has a polarized direction which causes said substantially linearly polarized light beam to be changed to one of a right circularly polarized light beam and a left circularly polarized light beam; and
said nonlinearly polarized light beam emitted from said second light emitting means has a pulse waveform.

17. An optical system as claimed in claim 15, wherein:
said polarizer outputs a fourth light beam in addition to said third light beam;
said optical system further comprises second light receiving means for receiving said fourth light beam which results from said first light beam which has been circularly polarized in a polarized direction opposite to that of said first light beam related to said third light beam.

18. An optical system as claimed in claim 17, further comprising second light emitting means for emitting a nonlinearly polarized light beam, wherein:
said nonlinearly polarized light beam emitted from said second light emitting means has a polarized direction which causes said substantially linearly polarized light beam to be changed to one of a right circularly polarized light beam and a left circularly polarized light beam; and
said nonlinearly polarized light beam emitted from said second light emitting means has a pulse waveform.

19. An optical system as claimed in claim 15, wherein said semiconductor device has a quantum well structure having a single quantum well.

20. An optical system as claimed in claim 15, wherein said semiconductor device has a multiple quantum well structure having a plurality of quantum wells.

21. An optical system as claimed in claim 15, wherein said semiconductor device has a superlattice structure having a plurality of quantum wells.

22. An optical OR logic operation method comprising the steps of:
projecting a first nonlinearly polarized light beam onto a semiconductor device;
projecting a second nonlinearly polarized light beam onto said semiconductor device in a state where said first nonlinearly polarized light beam is being projected onto said semiconductor device, said second nonlinearly polarized light beam having a pulse waveform functioning as first input data;
projecting a third nonlinearly polarized light beam onto said semiconductor device in a state where said first nonlinearly polarized light beam is being projected onto said semiconductor device, said second nonlinearly polarized light beam having a pulse waveform functioning as second input data, said semiconductor device having heavy holes and light holes, each of said first, second and third nonlinearly polarized light beams having a wavelength which excites either heavy holes or light holes so that electrons are generated; and
receiving said first nonlinearly polarized light beam which has an intensity peak caused by at least one of said second and third nonlinearly polarized light beams and which decreases due to a spin relaxation of said electrons, said intensity peak of the first nonlinearly polarized light beam corresponding to the result of an OR operation on said first data and said second data.

* * * * *